(12) United States Patent
Berghegger (10) Patent No.: US 8,792,257 B2
(45) Date of Patent: Jul. 29, 2014

(54) POWER CONVERTER WITH REDUCED POWER DISSIPATION

(75) Inventor: Ralf Schröder genannt Berghegger, Glandorf (DE)

(73) Assignee: Power Systems Technologies, Ltd., Ebene (MU)

( * ) Notice: Subject to any disclaimer, the term of this patent is extended or adjusted under 35 U.S.C. 154(b) by 630 days.

(21) Appl. No.: 13/071,705

(22) Filed: Mar. 25, 2011

(65) Prior Publication Data

US 2012/0243271 A1    Sep. 27, 2012

(51) Int. Cl.
*H02M 3/335*    (2006.01)

(52) U.S. Cl.
USPC ...................................... 363/21.15

(58) Field of Classification Search
CPC ................................. H02M 3/33507
USPC ............... 363/20, 21.01, 21.07, 21.09, 21.15, 363/21.17
See application file for complete search history.

(56) References Cited

U.S. PATENT DOCUMENTS

| | | |
|---|---|---|
| 1,376,978 A | 5/1921 | Stoekle |
| 2,473,662 A | 6/1949 | Pohm |
| 3,007,060 A | 10/1961 | Guenther |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |

(Continued)

FOREIGN PATENT DOCUMENTS

| | | |
|---|---|---|
| CN | 101141099 | 3/2008 |
| CN | 101202509 | 6/2008 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

*Primary Examiner* — Matthew Nguyen
(74) *Attorney, Agent, or Firm* — Boisbrun Hofman, PLLC (57) ABSTRACT

A power converter with reduced power dissipation at light loads and method of operating the same. In one embodiment, the power converter includes an opto-isolator circuit configured to produce an output signal dependent on an output characteristic of the power converter. The power converter also includes a controller configured to control the output characteristic to a first regulated value when the output signal is greater than or equal to a threshold level, and control the output characteristic to a second regulated value less than the first regulated value when the output signal is less than the threshold level.

20 Claims, 4 Drawing Sheets

(56) References Cited

U.S. PATENT DOCUMENTS

| | | |
|---|---|---|
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,672,245 A | 6/1987 | Majumdar et al. |
| 4,770,667 A | 9/1988 | Evans et al. |
| 4,770,668 A | 9/1988 | Skoultchi et al. |
| 4,780,653 A | 10/1988 | Bezos et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,055,991 A * | 10/1991 | Carroll et al. ............... 363/56.11 |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,453,923 A | 9/1995 | Scalais et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,661,642 A * | 8/1997 | Shimashita ............... 363/21.15 |
| 5,663,876 A | 9/1997 | Newton et al. |
| 5,671,131 A * | 9/1997 | Brown ............... 363/49 |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,386 A | 9/1998 | Gordon |
| 5,864,110 A | 1/1999 | Moriguchi et al. |
| 5,870,299 A | 2/1999 | Rozman |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,982,640 A * | 11/1999 | Naveed et al. ............... 363/21.15 |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,212,084 B1 | 4/2001 | Turner |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |

(56) References Cited

U.S. PATENT DOCUMENTS

| | | |
|---|---|---|
| 6,392,902 B1 | 5/2002 | Jang et al. |
| 6,396,718 B1 | 5/2002 | Ng et al. |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 * | 9/2002 | Yamada .................. 363/21.12 |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,559,689 B1 | 5/2003 | Clark |
| 6,563,725 B2 | 5/2003 | Carsten |
| 6,570,268 B1 | 5/2003 | Perry et al. |
| 6,580,627 B2 | 6/2003 | Toshino |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,839,247 B1 | 1/2005 | Yang et al. |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs |
| 6,906,934 B2 | 6/2005 | Yang et al. |
| 6,943,553 B2 | 9/2005 | Zimmerman |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,393,247 B1 | 7/2008 | Yu et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,453,709 B2 | 11/2008 | Park et al. |
| 7,462,891 B2 | 12/2008 | Brar et al. |
| 7,468,649 B2 | 12/2008 | Chandrasekaran |
| 7,489,225 B2 | 2/2009 | Dadafshar |
| 7,554,430 B2 | 6/2009 | Mehrotra et al. |
| 7,567,445 B2 | 7/2009 | Coulson et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manage et al. |
| 7,733,679 B2 | 6/2010 | Luger et al. |
| 7,746,041 B2 | 6/2010 | Xu et al. |
| 7,778,051 B2 | 8/2010 | Yang |
| 7,787,264 B2 | 8/2010 | Yang |
| 7,791,903 B2 | 9/2010 | Zhang |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,125,205 B2 | 2/2012 | Chandrasekaran et al. |
| 8,134,443 B2 | 3/2012 | Chandrasekaran et al. |
| 8,179,699 B2 | 5/2012 | Tumminaro et al. |
| 8,278,889 B2 | 10/2012 | Tataeishi |
| 8,638,578 B2 | 1/2014 | Zhang |
| 8,643,222 B2 | 2/2014 | Brinlee et al. |
| 2001/0020886 A1 | 9/2001 | Matsumoto et al. |
| 2001/0024373 A1 | 9/2001 | Cuk |
| 2001/0055216 A1 | 12/2001 | Shirato |
| 2002/0044463 A1 | 4/2002 | Bontempo et al. |
| 2002/0057080 A1 | 5/2002 | Telefus et al. |
| 2002/0071295 A1 | 6/2002 | Nishikawa |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0145888 A1 | 10/2002 | Yoshinaga et al. |
| 2002/0167385 A1 | 11/2002 | Ackermann |
| 2002/0176262 A1 | 11/2002 | Tripathi et al. |
| 2003/0026115 A1 | 2/2003 | Miyazaki |
| 2003/0030422 A1 | 2/2003 | Sula |
| 2003/0063483 A1 | 4/2003 | Carsten |

(56) References Cited

U.S. PATENT DOCUMENTS

| | | |
|---|---|---|
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0196672 A1 | 10/2004 | Amei |
| 2004/0200631 A1 | 10/2004 | Chen |
| 2004/0217794 A1 | 11/2004 | Strysko |
| 2004/0257095 A1 | 12/2004 | Yang |
| 2005/0024179 A1 | 2/2005 | Chandrasekaran et al. |
| 2005/0052224 A1 | 3/2005 | Yang et al. |
| 2005/0052886 A1 | 3/2005 | Yang |
| 2005/0207189 A1 | 9/2005 | Chen |
| 2005/0245658 A1 | 11/2005 | Mehrotra et al. |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0018136 A1 | 1/2006 | Takahashi |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0044845 A1 | 3/2006 | Fahlenkamp et al. |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2007/0007945 A1 | 1/2007 | King et al. |
| 2007/0010298 A1 | 1/2007 | Chang |
| 2007/0019356 A1 | 1/2007 | Morikawa |
| 2007/0025124 A1 | 2/2007 | Hansson |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0024094 A1 | 1/2008 | Nishihara et al. |
| 2008/0024259 A1 | 1/2008 | Chandrasekaran et al. |
| 2008/0031021 A1 | 2/2008 | Ros et al. |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0175026 A1 | 7/2008 | Yang |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tataeishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0027926 A1 | 1/2009 | Yang et al. |
| 2009/0046486 A1 | 2/2009 | Lu et al. |
| 2009/0097290 A1 | 4/2009 | Chandrasekaran |
| 2009/0109711 A1 | 4/2009 | Hsu |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1* | 11/2009 | Itoh et al. ............. 315/127 |
| 2009/0310388 A1 | 12/2009 | Yang |
| 2009/0315530 A1 | 12/2009 | Baranwal |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0202165 A1 | 8/2010 | Zheng et al. |
| 2010/0213989 A1 | 8/2010 | Nakatake |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0038179 A1 | 2/2011 | Zhang |
| 2011/0089917 A1 | 4/2011 | Chen et al. |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0243271 A1 | 9/2012 | Berghegger |
| 2012/0294048 A1 | 11/2012 | Brinlee |

FOREIGN PATENT DOCUMENTS

| | | |
|---|---|---|
| CN | 201252294 | 6/2009 |
| DE | 10310361 | 9/2004 |
| EP | 0 665 634 A1 | 1/1994 |
| JP | 57097361 | 6/1982 |
| JP | 3-215911 | 9/1991 |
| JP | 2000-68132 | 3/2000 |
| WO | 8700991 | 2/1987 |
| WO | 2010083511 | 7/2010 |
| WO | WO 2010/083511 A1 | 7/2010 |
| WO | WO 2010/083514 A1 | 7/2010 |
| WO | WO 2010/114914 A1 | 10/2010 |
| WO | 2011116225 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.
"AN101A: Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

(56) References Cited

OTHER PUBLICATIONS

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.
Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC-DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Maxim, Application Note 725, www.maxim-ic.com/an725, Maxim Integrated Products, Nov. 29, 2001, 8 pages.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
National Semiconductor Corporation, "LMC7660 Switched Capacitor Voltage Converter," www.national.com, Apr. 1997, 12 pages.
National Semiconductor Corporation, "LM2665 Switched Capacitor Voltage Converter," www.national.com, Sep. 2005, 9 pages.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.
Texas Instruments Incorporated, "LT1054, LT1054Y Switched-Capacitor Voltage Converters With Regulators," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparision of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Moder GaAs Processing Methods," 1990, pp. 66-67, Artech House, Inc., Norwood, MA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.
Xu, M., et al., "Voltage Divider and its Applciations in the Two-stage Power Architecture," Center for Power Electroncis Systems, VIrginia Polytechnic Institute and State University, IEEE, 2006, Blacksburg, Virginia, pp. 499-505.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.
Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.
Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.
Xu, P., et al., "A Novel Integrated Current Doubler Rectifier," IEEE 2000 Applied Power Electronics Conference, Mar. 2000, pp. 735-740, IEEE, Los Alamitos, CA.

(56) References Cited

OTHER PUBLICATIONS

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Ridley, R., Designing with the TL431, Switching Power Magazine, Designer Series XV, pp. 1-5, 2005.

\* cited by examiner

POWER CONVERTER WITH REDUCED POWER DISSIPATION

TECHNICAL FIELD

The present invention is directed, in general, to power electronics and, more specifically, to a power converter with reduced power dissipation at light loads.

BACKGROUND

A switched-mode power converter (also referred to as a "power converter") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of a power switch of the power converter. The duty cycle "D" is a ratio represented by a conduction period of a power switch to a switching period thereof. Thus, if a power switch conducts for half of the switching period, the duty cycle for the power switch would be 0.5 (or 50 percent). Additionally, as the voltage or the current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

Power converters designed to operate at low power levels typically employ a flyback power train topology to achieve low manufacturing cost. A power converter with a low power rating designed to convert ac mains voltage to a regulated dc output voltage to power an electronic load such as a printer, modem, or personal computer is generally referred to as a "power adapter" or an "ac adapter."

Power conversion efficiency for power adapters has become a significant marketing criterion, particularly since the publication of recent U.S. Energy Star specifications that require a power conversion efficiency of power adapters for personal computers to be at least 50 percent at very low levels of output power. The "One Watt Initiative" of the International Energy Agency is another energy saving initiative to reduce appliance standby power to one watt or less. These efficiency requirements at very low output power levels were established in view of the typical load presented by a printer in an idle or sleep mode, which is an operational state for a large fraction of the time for such devices in a home or office environment. A challenge for a power adapter designer is to provide a high level of power conversion efficiency (i.e., a low level of power adapter dissipation) over a wide range of output power.

Numerous strategies have been developed to reduce manufacturing costs and increase power conversion efficiency of power adapters over a wide range of output power levels, including the incorporation of a burst operating mode at very low output power levels. Other strategies include employing an energy-recovery snubber circuit or a custom integrated controller, and a carefully tailored specification. Each of these approaches, however, provides a cost or efficiency limitation that often fails to distinguish a particular vendor in the marketplace. Thus, despite continued size and cost reductions of components associated with power conversion, no satisfactory strategy has emerged to reduce power converter dissipation at low load currents.

Accordingly, what is needed in the art is a circuit and related method for a power converter that enables a further reduction in manufacturing cost while reducing power converter power dissipation, particularly at low load currents, that does not compromise end-product performance, and that can be advantageously adapted to high-volume manufacturing techniques for power adapters and other power supplies employing the same.

SUMMARY OF THE INVENTION

These and other problems are generally solved or circumvented, and technical advantages are generally achieved, by advantageous embodiments of the present invention, including a power converter with reduced power dissipation at light loads and method of operating the same. In one embodiment, the power converter includes an opto-isolator circuit configured to produce an output signal dependent on an output characteristic of the power converter. The power converter also includes a controller configured to control the output characteristic to a first regulated value when the output signal is greater than or equal to a threshold level, and control the output characteristic to a second regulated value less than the first regulated value when the output signal is less than the threshold level.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power adapter including a power converter operable at low load currents with reduced power dissipation. While the principles of the present invention will be described in the environment of a power converter, any application that may benefit from operation at low load with reduced power dissipation including a power amplifier or a motor controller is well within the broad scope of the present invention.

Figure 1:
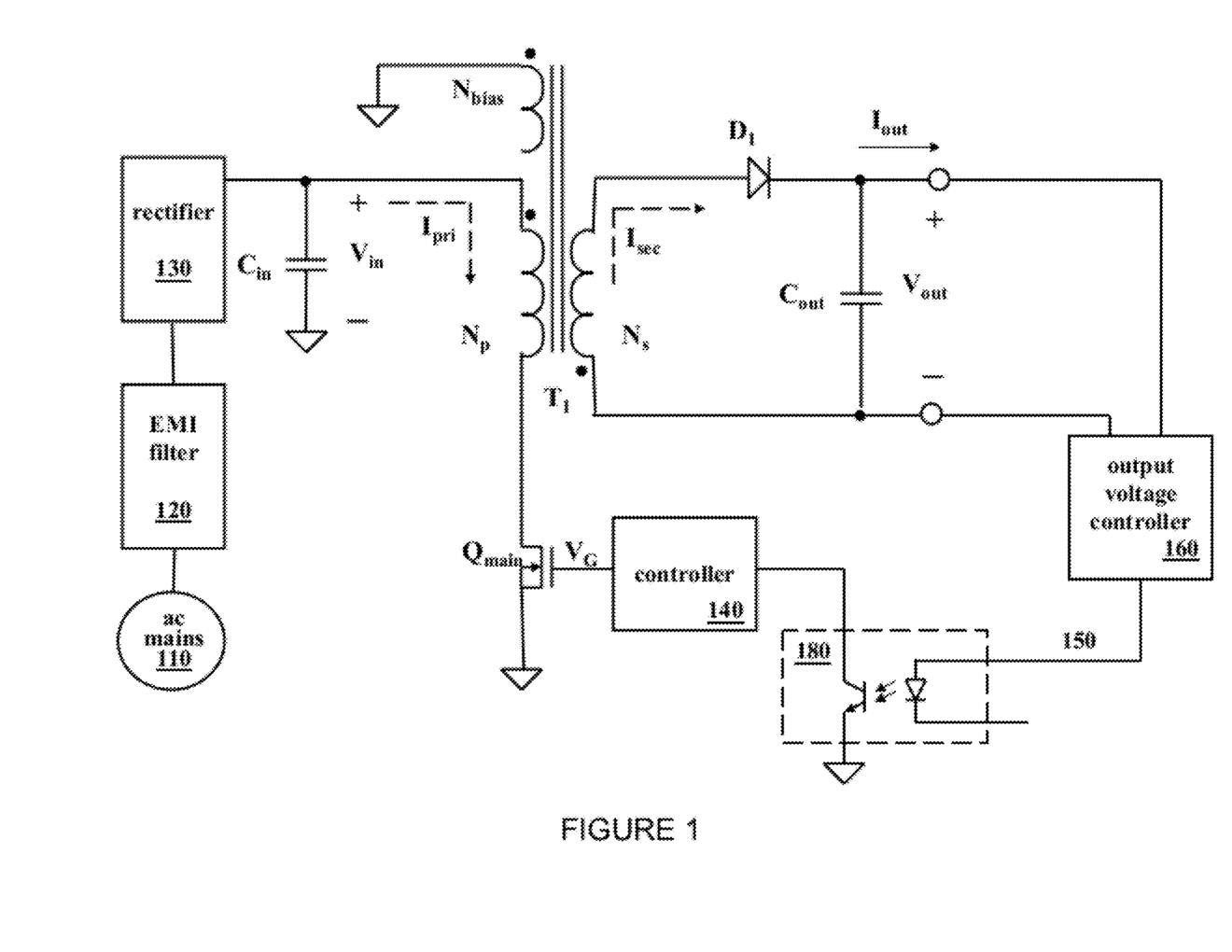
FIGS. 1 and 2 illustrate diagrams of embodiments of a power adapter including a power converter constructed according to the principles of the present.

Turning now to FIG. 1, illustrated is a schematic diagram of an embodiment of a power adapter including a power converter constructed according to the principles of the present invention. The power adapter is configured to convert ac mains voltage to a regulated dc output voltage $V_{out}$. A power train (e.g., a flyback power train) of the power converter (also referred to as a "flyback power converter") includes a power switch $Q_{main}$ coupled to a source of electrical power (e.g., an ac mains 110) via an electromagnetic interference ("EMI") filter 120, and an input filter capacitor $C_{in}$ to provide a substantially filtered dc input voltage $V_{in}$ to a magnetic device (e.g., an isolating transformer or transformer $T_1$). Although the EMI filter 120 illustrated in FIG. 1 is positioned between the ac mains 110 and a bridge rectifier 130, the EMI filter 120 may contain filtering components positioned between the rectifier 130 and a transformer $T_1$. The transformer $T_1$ has primary winding $N_p$ and secondary winding $N_s$ with a turns ratio that is selected to provide the output voltage $V_{out}$ with consideration of a resulting duty cycle and stress on power train components.

The power switch $Q_{main}$ (e.g., an n-channel field-effect transistor) is controlled by a controller (e.g., a pulse-width modulator ("PWM") controller 140) that controls the power switch $Q_{main}$ to be conducting for a duty cycle. The power switch $Q_{main}$ conducts in response to gate drive signal $V_G$ produced by the controller 140 with a switching frequency (often designated as "$f_s$"). The duty cycle is controlled (e.g., adjusted) by the controller 140 to regulate an output characteristic of the power converter such as an output voltage $V_{out}$, an output current $I_{out}$, or a combination thereof. A feedback path (a portion of which is identified as 150) enables the controller 140 to control the duty cycle to regulate the output characteristic of the power converter. A circuit isolation element, opto-isolator 180, is employed in the feedback path 150 to maintain input-output isolation of the power converter. The ac voltage or alternating voltage appearing on the secondary winding $N_s$ of the transformer $T_1$ is rectified by an auxiliary power switch (e.g., diode $D_1$ or, alternatively, by a synchronous rectifier, not shown), and the dc component of the resulting waveform is coupled to the output through the low-pass output filter including an output filter capacitor $C_{out}$ to produce the output voltage $V_{out}$. The transformer $T_1$ is also formed with a third winding (e.g., a bias winding) $N_{bias}$ that may be employed to produce an internal bias voltage for the controller 140 employing circuit design techniques well known in the art. The internal bias voltage produced by the third winding $N_{bias}$ is a more efficient process than an internal bias voltage produced by a bias startup circuit or startup circuit that typically employs a resistor with a high resistance coupled to the filtered dc input voltage $V_{in}$ to bleed a small, bias startup current therefrom.

During a first portion of the duty cycle, a current $I_{pri}$ (e.g., an inductor current) flowing through the primary winding $N_p$ of the transformer $T_1$ increases as current flows from the input through the power switch $Q_{main}$. During a complementary portion of the duty cycle (generally co-existent with a complementary duty cycle 1-D of the power switch $Q_{main}$), the power switch $Q_{main}$ is transitioned to a non-conducting state. Residual magnetic energy stored in the transformer $T_1$ causes conduction of a current $I_{sec}$ through the diode $D_1$ when the power switch $Q_{main}$ is off. The diode $D_1$, which is coupled to the output filter capacitor $C_{out}$, provides a path to maintain continuity of a magnetizing current of the transformer $T_1$. During the complementary portion of the duty cycle, the magnetizing current flowing through the secondary winding $N_s$ of the transformer $T_1$ decreases. In general, the duty cycle of the power switch $Q_{main}$ may be controlled (e.g., adjusted) to maintain a regulation of or regulate the output voltage $V_{out}$ of the power converter.

In order to regulate the output voltage $V_{out}$, a value or a scaled value of the output voltage $V_{out}$ is typically compared with a reference voltage using an error amplifier (e.g., in output voltage controller 160) to control the duty cycle. The error amplifier in the output voltage controller 160 controls a current in a light-emitting diode ("LED") of the opto-isolator 180 (similar to output voltage controller 260 as described hereinbelow with reference to FIG. 2). The controller 140 converts a resulting current produced in a transistor of the opto-isolator 180 to control the duty cycle. This forms a negative feedback arrangement to regulate the output voltage $V_{out}$ to a (scaled) value of the reference voltage. A larger duty cycle implies that the power switch $Q_{main}$ is closed for a longer fraction of the switching period of the power converter. Thus, the power converter is operable with a switching cycle wherein an input voltage $V_{in}$ is coupled to the transformer $T_1$ for a fraction of a switching period by the power switch $Q_{main}$ controlled by controller 140.

Figure 2:
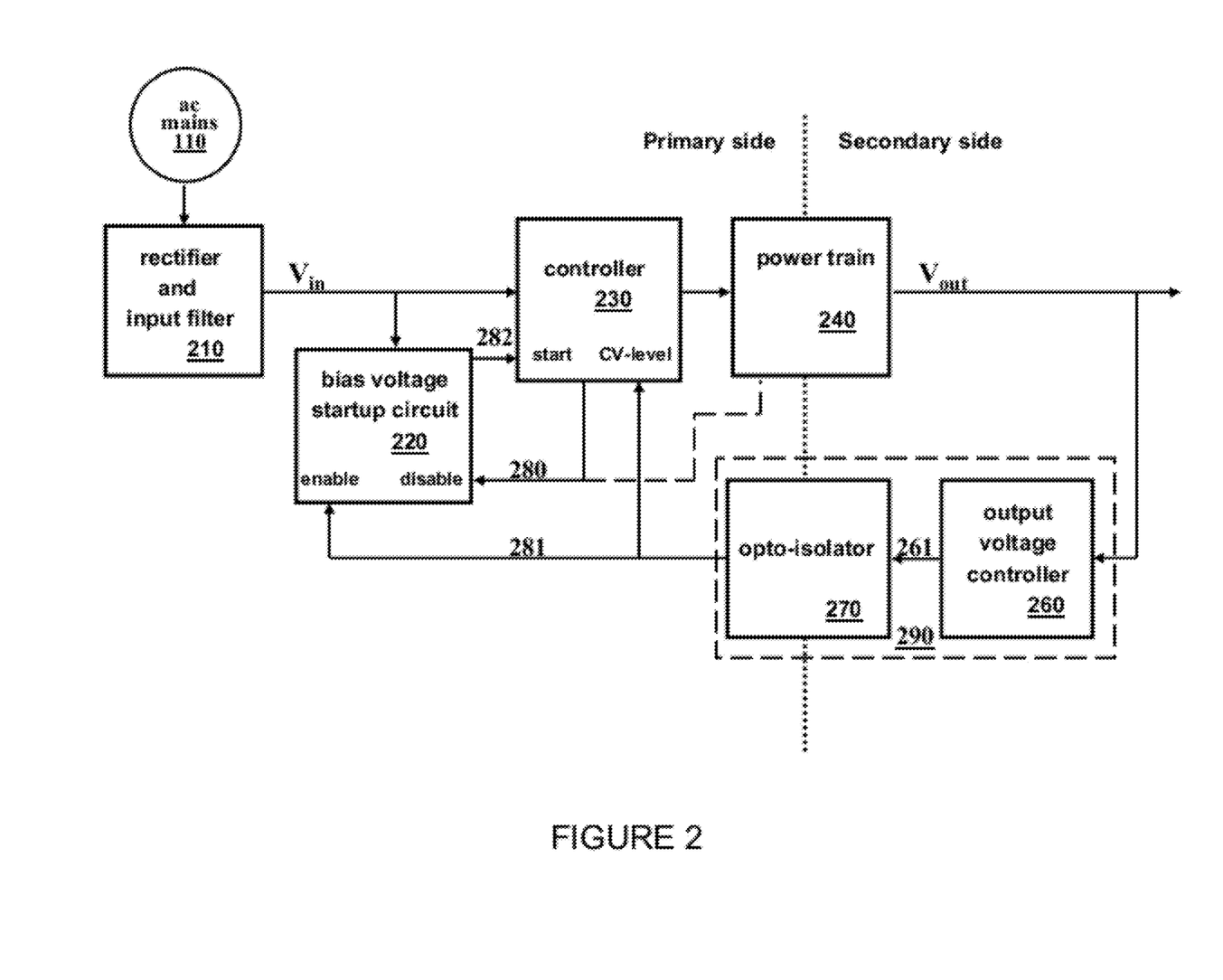

Turning now to FIG. 2, illustrated is a block diagram of an embodiment of a power adapter including a power converter constructed according to the principles of the present invention. The power converter is advantageously formed to draw very low power from an input voltage source at very low output current. For instance, the power converter formed with the architecture illustrated in FIG. 2 can potentially draw one milliwatt or less when its load is substantially disabled.

The power converter is coupled to a rectifier and input filter 210 that are coupled to ac mains 110 to provide a substantially filtered dc input voltage $V_{in}$. A controller 230 controls a switching action for a power switch coupled to transformer (such as power switch $Q_{main}$ and transformer $T_1$ illustrated in FIG. 1 but not shown in FIG. 2) of a power train 240 to control an output characteristic of the power converter such as its dc output voltage $V_{out}$.

Initially, the controller 230 is in a nonoperational state during a startup interval due to absence of an internal bias voltage. A bias voltage startup circuit or startup circuit 220 is coupled to the dc input voltage $V_{in}$ to produce a startup bias voltage on lead 282 during the startup interval, which is sufficient to initiate operation of the controller 230. Once the controller 230 has initiated its operation, which includes starting a switching action of at least one power switch, the controller 230 is able to efficiently produce its own internal bias voltage from an ac voltage produced across a transformer winding, such as transformer winding $N_{bias}$, illustrated in FIG. 1, of the transformer. This action is signaled to the bias voltage startup circuit 220 to disable production of the startup bias voltage, which is an inefficient process to produce a bias voltage, and thereby terminate the startup interval. Alternatively, initiation of operation of the controller 230 can be signaled on lead 280 to the bias voltage startup circuit 220 to terminate operation of the bias voltage startup circuit 220 by a voltage produced in the power train 240 in accordance with a transformer winding. A rectifier and output filter circuit as part of the power trains 240 is coupled to the transformer to produce the dc output voltage $V_{out}$.

An opto-isolator circuit 290 coupled to the dc output voltage $V_{out}$ (an output characteristic of the power converter) produces an output signal 281 in accordance with an output voltage controller 260 and an opto-isolator 270. Preferably, the output voltage controller 260 senses the dc output voltage $V_{out}$ with an error-amplifier to produce an output voltage error signal 261 that is coupled to opto-isolator 270. In the error amplifier, the resulting output voltage error signal 261 is produced with an inverted sense of the output characteristic. For example, if the dc output voltage $V_{out}$ exceeds a desired regulated value (a first regulated value), the output signal 281 from the opto-isolator 270 will have a low value. Correspondingly, if the dc output voltage $V_{out}$ is less than the desired regulated value, the output signal 281 from the opto-isolator 270 will have a high value.

The output signal 281 from the opto-isolator 270 is coupled to the bias voltage startup circuit 220 and to the controller 230. The controller 230 uses the output signal 281 to control the dc output voltage $V_{out}$ to the first, desired regulated value, such as five volts, when the output signal 281 from the opto-isolator 270 is greater than or equal to a threshold level, such as one microampere and to control the dc output voltage $V_{out}$ to a second regulated value less than the first, desired regulated value, such as 2.5 volts, when the output signal 281 from the opto-isolator 270 is less than the threshold level. The second regulated value is a level sufficient for opto-isolator circuit 290 to be powered by the output characteristic such as the dc output voltage $V_{out}$. In an embodiment, the second regulated value is one-half the first regulated value, but other values for the second regulated value are contemplated within the broad scope of the present invention.

The controller 230 is configured to control the output characteristic such as the dc output voltage $V_{out}$ to the second regulated value by sensing a voltage of a winding of a transformer, such as the transformer T1 illustrated in FIG. 1, which avoids the need for the opto-isolator circuit 290 to be operational at low values of the output characteristic. The voltage of the winding of the transformer can be sensed with a diode and a resistor-capacitor network acting as a low-pass filter coupled to the winding. Recall that the controller 230 terminates operation of bias voltage startup circuit 220 when a switching action for the power switch coupled to the transformer commences. The operation of the bias voltage startup circuit 220 is reinitiated when the output signal 281 from the opto-isolator circuit 290 is larger than a threshold value, which occurs when the output voltage is less then the first regulated value. This happens when the supply voltage of the controller 230 has dropped below a predetermined supply voltage such as its minimum supply voltage, which can happen when the switching frequency is very low. Otherwise, the bias voltage startup circuit 220 stays in an off state.

The operation of the bias voltage startup circuit 220 is reinitiated after an optional delay period, such as ten milliseconds, when the switching action for the switch terminates. The controller 230 may be operational without the delay period if the bias voltage startup circuit 220 is activated at power on and the supply voltage of the controller 230 does not drop below a predetermined supply voltage such as its minimum supply voltage when the switching frequency is lowest. Operation of the bias voltage startup circuit 220 spans the startup interval.

The controller 230 can be configured to disable a switching frequency of the power converter dependent on the output characteristic such as the dc output voltage $V_{out}$ or another output characteristic of the power converter such as an output current. For example, the controller 230 can disable the switching frequency if a duty cycle therein is less than a duty cycle threshold and/or the output characteristic such as the dc output voltage $V_{out}$ exceeds the first, desired regulated value. The operation of the controller 230 can be turned off when the switching frequency of the power converter is disabled.

The operation of the power converter illustrated in FIG. 2 can be explained further as follows. The bias voltage startup circuit 220 starts the controller 230. After startup, such as when sufficient bias voltage has been produced by the bias voltage startup circuit 220, the controller 230 terminates the bias voltage startup circuit 220 to reduce power loss. At no load, the off time of the controller 230 is essentially so long that it goes into lockout. It stays unpowered until the dc output voltage $V_{out}$ falls lower than the desired, first regulated value of the output voltage controller 260 to avoid power loss. If the output signal 281 from the opto-isolator circuit 290 rises above a threshold level, the bias voltage startup circuit 220 is reinitiated (i.e., the startup interval is reinitiated). Thus, a minimal current produced by the opto-isolator circuit 290 reactivates the bias voltage startup circuit 220. The controller 230 is started again and a small amount of power is transferred to the secondary side of the power trains 240. Due to this action, the dc output voltage $V_{out}$ rises slightly above the desired first regulated value, and the controller 230 at low output current again goes into lockout.

Figure 3:
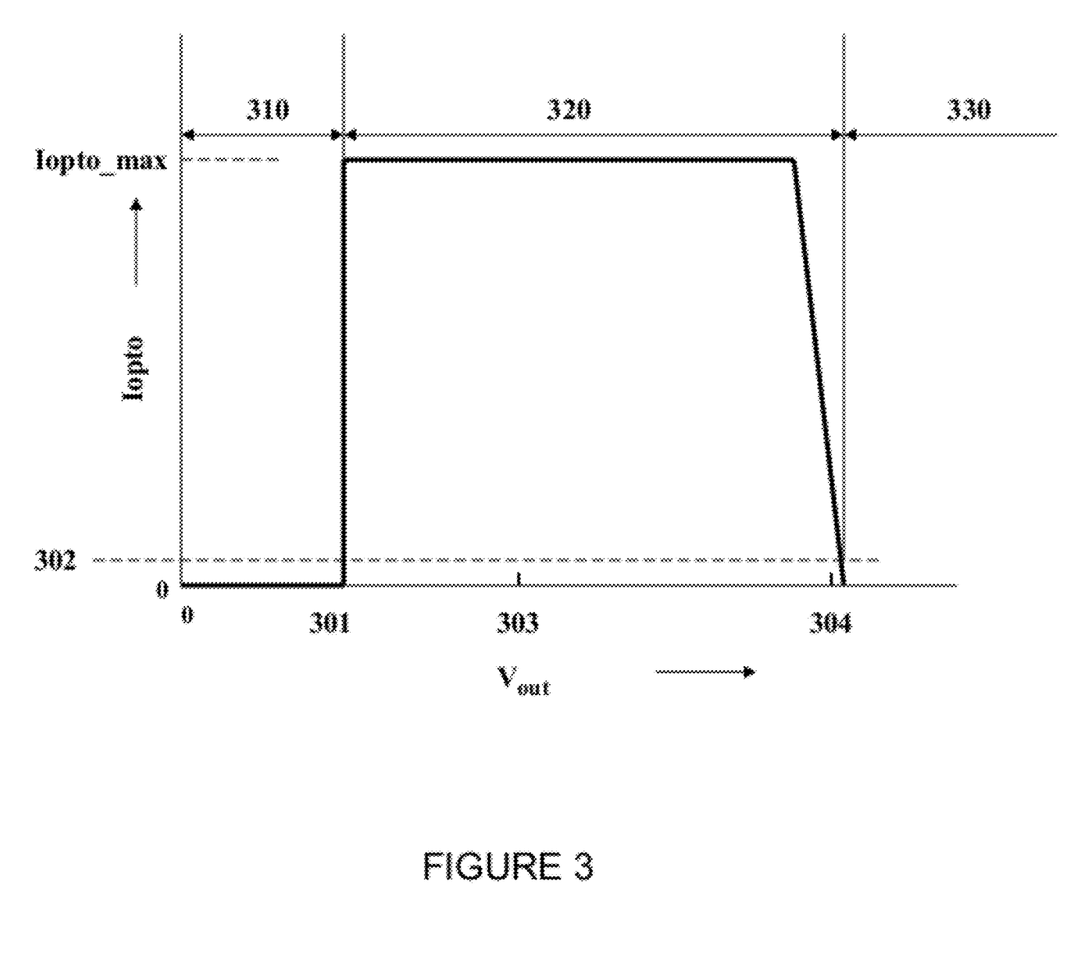
FIG. 3 illustrates a graphical representation of an exemplary output signal Iopto from an opto-isolator circuit verses an output characteristic according to the principles of the present invention.

Turning now to FIG. 3, illustrated is a graphical representation of an exemplary output signal Iopto (in milliamperes) from an opto-isolator circuit verses an output characteristic (e.g., an output voltage Vout in volts) according to the principles of the present invention.

FIG. 3 illustrates a first regulated value (e.g., five volts) 304 of the output voltage $V_{out}$ and a second regulated value (e.g., 2.5 volts) 303 of the output voltage $V_{out}$ that is one-half of the first regulated value 304. As shown in FIG. 3, when the output voltage $V_{out}$ is greater than a lower output voltage operational limit 301, the opto-isolator circuit produces an output signal Iopto with an inverted sense around a desired, regulated output voltage of five volts, saturating at a maximum opto-isolator value Iopto_max at the lower output voltages. Below the lower output voltage operational limit 301, the opto-isolator circuit is not operational because it derives its bias voltage from the output voltage $V_{out}$, and accordingly the opto-isolator circuit produces essentially a zero output signal Iopto.

When the output signal Iopto from the opto-isolator circuit is less than a low threshold level 302, the controller is thereby signaled that there is essentially no output voltage $V_{out}$, and proceeds to regulate the output voltage to the second regulated value 303 by sensing a transformer winding of a transformer to enable the opto-isolator circuit to be operational again. Thus, the first regulated value 304 of the output voltage $V_{out}$ is active in a region 320, and the second regulated value 303 of the output voltage $V_{out}$ is active in regions 310, 330.

Figure 4:
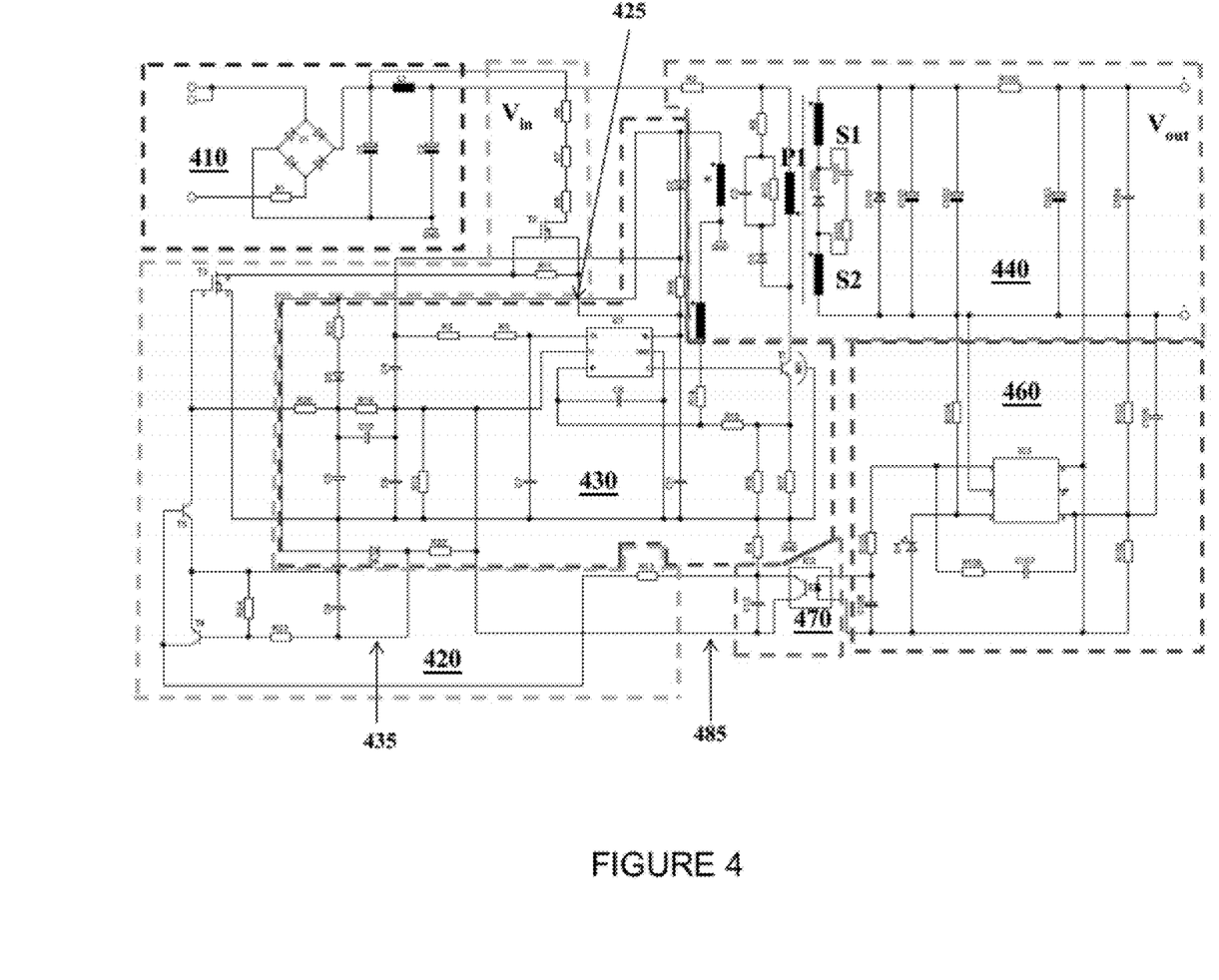
FIG. 4 illustrates a schematic diagram of an embodiment of a power adapter including a power converter constructed according to the principles of the present invention.

Turning now to FIG. 4, illustrated is a schematic diagram of an embodiment of a power adapter including a power converter constructed according to the principles of the present invention. The power adapter includes a rectifier and input filter 410 constructed with diode bridge D1, filter capacitors C1 and C2, and filter inductor L1 to produce a filtered dc input voltage $V_{in}$ for the power converter. A resistor R1 is included to provide an in-rush current limiting function when the power converter is initially coupled to an input voltage source such as an ac mains.

A bias voltage startup circuit or startup circuit 420 is constructed with the series-circuit arrangement of resistors R6, R7, R8 that are coupled to the dc side of the diode bridge D1 to provide a small trickle-charge current to charge bias voltage filter capacitor C11. The three resistors R6, R7, R8 are included in the circuit to accommodate a high dc input voltage as well as power dissipation in this portion of the circuit. When the bias voltage startup circuit 420 is disabled, a switch T2 is turned off to disable current flow through the series-circuit arrangement of the resistors R6, R7, R8. During normal switching action of the power converter, the bias voltage filter capacitor C11 is charged through a diode D2 and a resistor R18 that are coupled to a winding W1 of a transformer in a power train 440. The bias voltage startup circuit 420 is coupled to the filtered dc input voltage $V_{in}$ to produce a startup bias voltage on lead 425 during a startup interval, which is sufficient to initiate operation of a controller 430 (similar to lead 282 in FIG. 2).

A controller 430 includes an integrated circuit IC1 that produces a pulse-width modulated signal at the integrated circuit IC1 terminal "G" to control the base of a switch T1. The collector of the switch T1 is coupled to a primary winding P1 of a transformer in the power train 440 to produce a switching action for the power converter. The power train 440 includes a diode D3, a capacitor C3, a resistor R10, and a resistor R9 to absorb spikes and ringing produced across the primary winding P1 of the transformer when the switch T1 is turned off. The secondary windings S1, S2 of the transformer are coupled in series in a flyback circuit topology to rectifier and output filter of the power train 440. A diode D100 provides the primary rectification function for the output voltage $V_{out}$. Capacitors C101, C102, C103, C104 and resistor R100 provide filtering for the output voltage $V_{out}$. The initiation of operation of the controller 430 can be signaled on lead 435 to the bias voltage startup circuit 420 to terminate operation of the bias voltage startup circuit 420 by a voltage produced in a power train 440 in accordance with a transformer winding (similar to lead 280 in FIG. 2).

An opto-isolator circuit includes an output voltage controller 460 including an integrated circuit IC3 that senses the output voltage $V_{out}$ of the power converter at integrated circuit IC3 pin 6 and produces an error voltage control signal at integrated circuit IC3 pin 1 that is coupled to an opto-isolator 470 through resistor R105. A resistor R106 and capacitor C107 in conjunction with the resistor R105 provide pole-zero compensation for an output signal (a feedback signal) 485 produced by an opto-isolator 470 of the opto-isolator circuit (similar to output signal 281 of FIG. 2). The determination of the location of poles and zeros in a feedback circuit is well known in the art and will not be repeated here in the interest of brevity.

The opto-isolator 470 produces a current at its output signal 485 that becomes a feedback voltage as this current is conducted through a resistor R4. The current is coupled through a resistor R13 to the controller 420. The current in the opto-isolator 470 also goes through a voltage divider formed with resistors R12, R19, which causes an offset to the feedback voltage. The resulting feedback voltage enables the controller 430 (in accordance with the output voltage controller 460) to regulate the duty cycle for the switch T1 to control the output voltage $V_{out}$ of the power converter. A capacitor C13 typically has very small capacitance. The capacitor C13 is included for EMI-management purposes, and it has almost no effect on the control loop.

The controller 430 senses the voltage at its pin U to control the output voltage $V_{out}$. When the voltage at pin U is lower than a reference voltage it switches with a high (e.g., maximum) duty cycle. When the voltage at pin U is above the reference voltage, the switch T1 is switched off until the voltage at pin U drops below the reference voltage. The voltage divider formed with resistors R12, R19 in the controller 430 is proportioned for the second regulated value. Thus, the voltage is controlled to the second regulated value when there is no current in the opto-isolator 470. When there is a current in the opto-isolator 470, this pulls down the voltage level at pin U so that the output voltage $V_{out}$ rises until the voltage at pin U is at reference level.

Therefore, the first regulated value can be controlled by the output voltage controller 460 by increasing and decreasing the current in the opto-isolator 470. If the output voltage $V_{out}$ gets above the first regulated value, then the opto-isolator 470 current becomes zero. Then the voltage at pin U is much higher than the reference voltage because the capacitor C5 is charged to the voltage corresponding to the first regulated value, while the voltage divider (R19, R12) is set to the second regulated value. That causes a very long off time because the capacitor C5 is discharged to the voltage corresponding to the second regulated value before the switch T1 is switched on again (unless there is again current in the opto-isolator 470). During this time, the capacitor C11 is discharged so that the supply voltage of the integrated circuit IC1 drops below a level such as the minimum required supply voltage and the integrated circuit IC1 is switched off. The integrated circuit IC1 stays off until the bias voltage startup circuit 420 is activated either by current in the opto-isolator 470 or due to very low voltage at the capacitor C5 (i.e., lower than the threshold voltage of the switch T3). The diode-and-resistor-capacitor network D5, R12, R19, R21, C5, C6, C10 senses a voltage of a winding of the transformer to allow the controller 430 to control the output voltage $V_{out}$ to the second (lower) regulated value.

In Table I below, representative values are listed for the circuit elements illustrated in FIG. 4.

TABLE I

| | | | | | |
|---|---|---|---|---|---|
| C2 | 10 μF | R3 | 150 kΩ | R24 | 10 MΩ |
| C3 | 150 pF | R4 | 2 MΩ | R100 | 0.1 Ω |
| C5 | 100 nF | R5 | 3.48 MΩ | R102 | 392 kΩ |
| C6 | 47 pF | R6 | 8.25 kΩ | R103 | 1 MΩ |
| C7 | 100 pF | R7 | 8.25 kΩ | R104 | 1 MΩ |
| C8 | 4.7 pF | R8 | 8.25 kΩ | R105 | 20 kΩ |
| C9 | 47 pF | R11 | 3 MΩ | R106 | 274 Ω |
| C10 | 27 pF | R12 | 1.18 MΩ | IC1 | MC4LTE |
| C11 | 100 nF | R13 | 619 kΩ | IC2 | HCNW136 |
| C13 | 4.7 pF | R14 | 698 kΩ | IC3 | LPV511 |
| C100 | 100 pF | R15 | 10 kΩ | L1 | 680 μH |
| C101 | 220 μF | R16 | 4.7 Ω | T1 | TS13003BCT |
| C102 | 220 μF | R17 | 5.62 Ω | T2 | BSS126 |
| C103 | 220 μF | R18 | 10 Ω | T3 | BS170 |
| C104 | 100 nF | R19 | 4.99 MΩ | T4 | BC847G-B |
| C106 | 100 nF | R20 | 10 MΩ | T5 | BC847G-B |
| C107 | 22 nF | R21 | 47.5 Ω | R2 | 2.49 Ω |
| C108 | 0 pF | R22 | 6.19 MΩ | C4 | 0 pF |
| | (optional) | | | | (optional) |

A flyback power converter with a power output rating of 5 watts was constructed as described previously hereinabove with no-load power dissipations as listed below in Table II.

TABLE II

| Measurement time after startup, minutes | AC Input Voltage, volts | Input Power, mW |
|---|---|---|
| 30 | 115 | 0.6 |
| 30 | 230 | 1.6 |
| 90 | 230 | 1.2 |
| 240 | 230 | 1.1 |

The input power shown in the table above declines slowly over time due to the decreasing leakage current of the primary bulk capacitors. These are aluminum-electrolytic capacitors which cause a significant part of the total power loss at no load due to their leakage current, which significantly decreases when the capacitors are charged to a constant voltage for some time.

Thus, a power converter with reduced power dissipation at light loads and method of operating the same has been introduced herein. In one embodiment, the power converter includes an opto-isolator circuit configured to produce an output signal dependent on an output characteristic of the power converter. The power converter also includes a controller configured to control the output characteristic to a first regulated value when the output signal is greater than or equal to a threshold level, and to control the output characteristic to a second regulated value less than the first regulated value when the output signal is less than the threshold level.

Those skilled in the art should understand that the previously described embodiments of a switched-capacitor power converter and related methods of operating the same are submitted for illustrative purposes only. While the principles of the present invention have been described in the environment of a power converter, these principles may also be applied to other systems such as, without limitation, a power amplifier or a motor controller. For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power converter, comprising:
   an opto-isolator circuit configured to produce an output signal dependent on an output characteristic of said power converter; and
   a controller configured to:
      control said output characteristic to a first regulated value when said output signal is greater than or equal to a threshold level, and
      control said output characteristic to a second regulated value less than said first regulated value when said output signal is less than said threshold level.

2. The power converter as recited in claim 1 wherein said second regulated value comprises a level sufficient for said output characteristic to power said opto-isolator circuit.

3. The power converter as recited in claim 1 wherein said controller is configured to control said output characteristic to said second regulated value in accordance with a voltage of a winding of a transformer.

4. The power converter as recited in claim 3 wherein said voltage of said winding of said transformer is sensed with a diode and resistor-capacitor network.

5. The power converter as recited in claim 1 further comprising a startup circuit configured to power said controller to initiate a switching action for a switch during a startup interval, said controller configured to terminate an operation of said startup circuit after said switching action for said switch commences.

6. The power converter as recited in claim 5 wherein said operation of said startup circuit is configured to be reinitiated after a delay period when said switching action for said switch terminates.

7. The power converter as recited in claim 5 wherein said operation of said startup circuit is configured to be reinitiated in accordance with said output signal from said opto-isolator circuit.

8. The power converter as recited in claim 1 wherein said output signal is an inverted sense of said output characteristic.

9. The power converter as recited in claim 1 wherein said controller is configured to disable a switching frequency of said power converter dependent on said output characteristic or another output characteristic of said power converter.

10. The power converter as recited in claim 9 wherein said controller is turned off when said switching frequency of said power converter is disabled.

11. A method, comprising:
    producing an output signal from an opto-isolator circuit dependent on an output characteristic of a power converter;
    controlling said output characteristic to a first regulated value when said output signal is greater than or equal to a threshold level, and
    controlling said output characteristic to a second regulated value less than said first regulated value when said output signal is less than said threshold level.

12. The method as recited in claim 11 wherein said second regulated value comprises a level sufficient for said output characteristic to power a circuit for producing said output signal.

13. The method as recited in claim 11 wherein controlling said output characteristic to said second regulated value is performed in accordance with a voltage of a winding of a transformer.

14. The method as recited in claim 13 wherein said voltage of said winding of said transformer is sensed with a diode and resistor-capacitor network.

15. The method as recited in claim 11 further comprising powering a start up circuit for an initiation of a switching action for a switch during a startup interval, and terminating an operation of said startup circuit after said switching action for said switch commences.

16. The method as recited in claim 15 further comprising reinitiating said operation of said startup circuit after a delay period when said switching action for said switch terminates.

17. The method as recited in claim 15 further comprising reinitiating said operation of said startup circuit in accordance with said output signal from said opto-isolator circuit.

18. The method as recited in claim 11 wherein said output signal is an inverted sense of said output characteristic.

19. The method as recited in claim 11 further comprising disabling a switching frequency of said power converter dependent on said output characteristic or another output characteristic of said power converter.

20. The method as recited in claim 19 wherein said method is disabled when said switching frequency of said power converter is disabled.

* * * * *